United States Patent [19]

Morrison

[11] 4,044,441
[45] Aug. 30, 1977

[54] BEARINGS
[75] Inventor: William Craig Morrison, Doonfoot, Scotland
[73] Assignee: The Glacier Metal Company Limited, Wembly, England
[21] Appl. No.: 496,827
[22] Filed: Aug. 12, 1974
[30] Foreign Application Priority Data
  Aug. 15, 1973 United Kingdom ............ 39538/73
[51] Int. Cl.² ............................................ B21D 53/10
[52] U.S. Cl. ......................... 29/149.5 R; 29/149.5 C; 29/149.5 DP; 29/149.5 S
[58] Field of Search ............... 29/149.5 C, 149.5 DP, 29/148.4 A, 149.5 R

[56] References Cited
U.S. PATENT DOCUMENTS

| 1,441,459 | 1/1923 | Small | 29/149.5 C |
| 1,910,285 | 5/1933 | Fiegel et al. | 29/149.5 R |
| 1,931,162 | 10/1933 | Kranz et al. | 29/149.5 C |
| 1,971,433 | 8/1934 | Tartrais | 29/149.5 C |
| 1,981,276 | 11/1934 | McCullough | 29/149.5 C |
| 2,259,023 | 10/1941 | Clark | 29/149.5 R |
| 2,821,010 | 1/1958 | Vasconi et al. | 29/149.5 R |
| 3,455,004 | 7/1969 | Tethal | 29/149.5 C |
| 3,464,802 | 9/1969 | Meyer | 29/191 X |
| 3,559,263 | 2/1971 | Cavagnero et al. | 29/149.5 C |

FOREIGN PATENT DOCUMENTS 1,232,002  1/1967  Germany ...................... 29/149.5 S Primary Examiner—C.W. Lanham
Assistant Examiner—V. K. Rising
Attorney, Agent, or Firm—Pierce, Scheffler & Parker

[57] ABSTRACT

A method of making bearing bushes by joining together a plurality of segments along joints parallel to the bearing axis. In the preferred method, two semicylindrical segments are used, and are joined by electron beam welding. The welding is the last operation in the manufacture of the bush.

4 Claims, 3 Drawing Figures

BEARINGS

This invention relates to the manufacture of bearing bushes. It is directed in particular to the problem of making high-precision bushes from flat sheet material by mass-production methods.

The permissible tolerances for a typical high-precision bush might be 0.0005 inch on the wall thickness, 0.001 inch on the concentricity of the inner and outer surfaces, and 0.0005 inch on the run-out. It is possible to make bushes to these tolerances by machining from solid material, but this is an expensive method.

In a previously known methods of making bearing bushes from flat sheet material, only one piece of sheet material is used, and this bent around 360° to form the bush. Such a method is described, for example, in British Pat. No. 1,159,268. Only a very small proportion of the bushes produced by this method will fall within tolerances as small as those quoted above, and this method is not therefore suitable for the mass-production of high-precision bushes.

A further disadvantage of previously-known methods is that the circumferential direction of the finished bush lies initially along the length of the strip material from which they are made. This necessitates the use of a greater length of narrower material than would be needed if the bushes could be made with the circumferential direction of the finished bush lying across the width of the strip. For example, where bushes having an axial length of 2 inches and a circumference of 12 inches are being produced, 12 inches of strip, 2 inches wide are needed, instead of the 2 inches of strip, 12 inches wide, which would be needed if the alternative orientation could be used. Since, where the strip material consists of a layer of a bearing material bonded to a steel backing, the cost per unit area of the material increases with narrower strip width, the previously-known methods result in a higher cost than if the alternative orientation could be used. However, even if the method of making a bush from a single piece of strip material were modified to use the alternative orientation, there would then be a limit to the size of bush which could be made, since there is a limit to the width of strip material that can be produced.

It is an object of the present invention to provide a method of producing high-precision bearing bushes which is suitable for use in mass-production.

It is another object of the present invention to make it possible to produce high-precision bearings from flat sheet material without the need for finish machining.

It is another object of the present invention to reduce the cost of producing bearing bushes from flat sheet material coated with a layer of bearing material.

According to one aspect of the present invention a method of producing a bearing bush comprises the steps of providing a plurality of part-cylindrical bearing bush segments each having a convex outer surface, a concave inner surface, a pair of part annular end faces, and a pair of side faces, assembling said bearing bush segments to form an annular bush pre-assembly in which side faces of adjacent segments are contiguous one with another, and joining together segments of said pre-assembly at their respective contiguous side faces whereby a bush having an essentially continuous internal cylindrical bearing surface is formed.

Preferably said plurality of segments comprises two similar semi-cylindrical segments. Apparatus for producing semi-cylindrical bearing shells for use in split bearings is already known, and is suitable for producing segments for use in the method of the present invention with only slight modification. Using these methods, there is little difficulty in meeting the tolerances quoted above, even in mass-production.

The segments may be joined by welding, preferably electron beam welding. According to an advantageous feature of this invention the ouer edges of the meeting surfaces of the segments are chamfered so as to form, prior to welding, a V-shaped groove on the external surface of the assembled segments. Using this method of welding, it is possible to ensure that the welds do not project above the generally cylindrical outer surface of the bush, so that no finish machining is required. It is also possible to control the welding process sufficiently accurately that, where the segments consist of a steel backing with a lining of a bearing material the welds do not penetrate into the bearing material. Thus the bearing material, which generally has a lower melting point than the backing, is not disturbed by the welding.

Because the circumferential length of each segment is only a fraction of the circumference of the bush, the method allows the production of bushes of large size from strip of limited width, even though the circumferential direction of the segment may lie initially across the width of the strip.

The invention may be carried into practice in various ways, but one specific embodiment will now be described by way of example, with reference to the accompanying drawings, of which:

Figure 1:
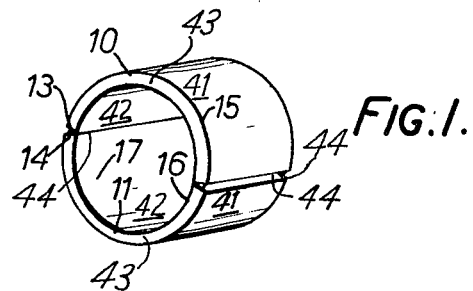
FIG. 1 is a perspective view of a bearing bush.

The bearing bush shown in FIG. 1 consists of two semi-cylindrical half-bushes 10 and 11 electron beam welded together. Each half-bush consists of a backing 15 of a strong metallic material such as steel, a layer 16 of a bearing material applied to the concave surface of the backing, and a thin overlay 17 applied to the surface of the bearing material. The half-bushes 10 and 11 are produced by pressing from a flat sheet of backing material, which has the bearing material layer 16 and the overlay 17 applied to it before pressing. Since the half-bushes are very similar to the semi-cylindrical bearing shells used in split bearings, their manufacture will not be described in detail. One form of apparatus which might be used with only slight modifications to produce the half-bushes is that shown in commonly assigned co-pending patent application No. 273,634. The apparatus described in that application is arranged to produce semi-cylindrical bearing shells from a continuous strip of material; the width of the strip corresponds to the circumferential length of the shell, while the length of strip required for each shell corresponds to the axial length of the shell. The main difference between the half-bushes 10 and 11 and a conventional half-bearing shell is that the half-bushes must be truly semicylindrical when unstressed, whereas a half-bearing shell is so shaped that it is only truly semi-cylindrical when it is pushed into a semi-cylindrical housing. Each half-bush has a convex outer surface 41, a concave inner surface 42, a pair of part annular end faces 43 and a pair of side faces 44.

Each half-bush is slightly chamfered, as shown at 13 and 14, along those edges which are to be welded together, so that when the half-bushes are placed together for welding, a V-groove is formed, opening on to the convex side of the bush. The chamfering is confined to the backing 15, so that the groove does not extend into the layers 16. The electron beam welding operation is carried out from the convex side of the bush; the metal deposited during welding partially fills the grooves between the half-bushes, but does not project outside the convex surface of the bush. The weld does not penetrate as far as the radially inner surfaces of the backings 15, and therefore the bearing material layers 16 are not disturbed by the welding process.

Figure 2:
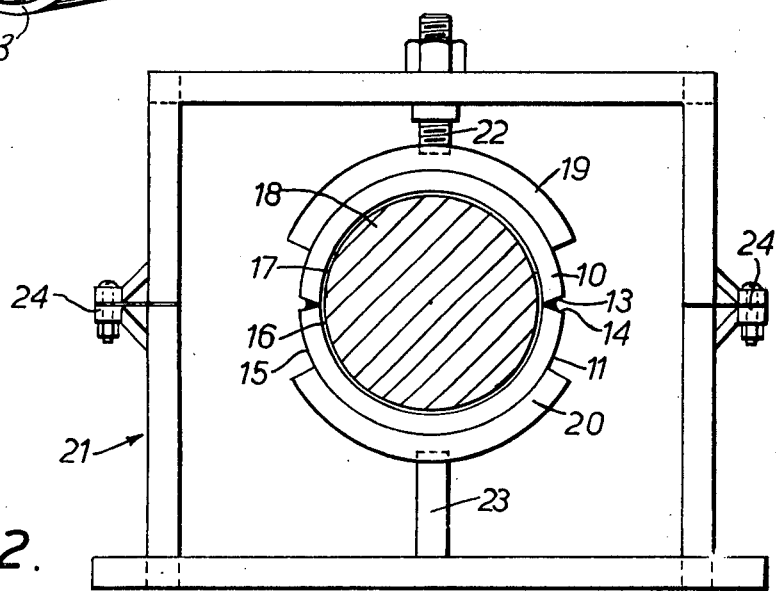
FIG. 2 is an end view of part of the apparatus used in making the bush of FIG. 1.
Figure 3:
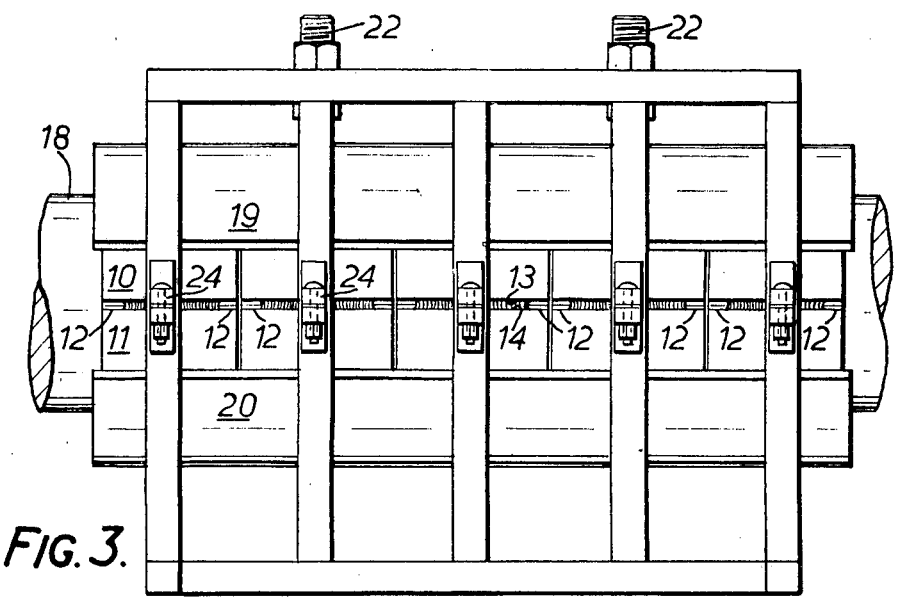
FIG. 3 is a side view of the part of the apparatus shown in FIG. 2.

FIGS. 2 and 3 show part of the apparatus used in welding together the half-bushes 10 and 11. The apparatus includes a frame 21, which is divided into top and bottom halves which can be fastened together by bolts 24. A trough 20 is fixedly supported in the bottom half of the frame by supports 23; the inner surface of the trough 20 is curved to match the radius of the outer surface of the half-bushes 10 and 11, and extends around an arc of about 120°. The upper half of the frame 21 carries a similar trough 19, but in an inverted position; the trough 19 is connected to the frame 21 by screws 22.

In use, one or more half-bushes are placed in the trough 20, and arranged to lie symmetrically about a vertical plane through the axis of curvature of the trough. The apparatus is illustrated with five half-bushes placed end to end in the trough 20. A mandrel 18 is then laid in the half-bushes; the diameter of the mandrel is equal to, or very slightly less than, the internal diameter of the finished bushes. Further half-bushes are then placed over the mandrel 18, care being taken that each half-bush lies in the same axial position along the mandrel as a corresponding one of the half-bushes in the trough 20. The top half of the frame 21 is then bolted in place, and the trough 19 lowered by means of the screws 22 to clamp the half-bushes and the mandrel 18. The assembly is then placed in a vacuum chamber (not shown) which is then sealed and evacuated. The half-bushes 10 and 11 are then welded together along their chamfered edges 13 and 14 by means of two electron beam welding heads (not shown), one on each side of the frame 21.

Where, as in the present case, more than one pair of half-bushes is welded together in a single loading of the apparatus, and the different pairs of half-bushes are positioned close to one another in the axial direction, the welds between the half-bushes may be interrupted near the ends of each bush, as indicated at 12, to ensure that one bush does not become welded to the adjacent bush.

The frame 24 can then be removed from the vacuum chamber, and the bushes removed from the apparatus. The mandrel 18 may be a collapsing mandrel to facilitate withdrawal from the bushes. Little or no further machining will then be required to finish the bushes to the required tolerances.

What I claim as my invention and desire to secure by Letters Patent is:

1. A method of producing a bearing in which a bush for insertion in a bearing housing is produced by the steps of pressing from flat sheet material comprising a strong backing and a layer of bearing lining, two semi-cylindrical bearing bush segments each segment having a convex surface, a concave inner surface, a pair of part annular end faces, and a pair of side faces;

assemblying said bearing bush segments to form a complete annular bush pre-assembly in which side faces of adjacent segments are close to one another but separated by a V-groove;

welding together adjacent segments of said pre-assembly by deposition of metal in the V-grooves in contact with the side faces of the backings but not in contact with the linings to provide a complete self-supporting bush having an essentially continuous internal cylindrical bearing surface; and then inserting the bush in the bearing housing in which method a plurality of segments are supported to form a plurality of bushes arranged end to end, and are joined, except along the end faces of said bushes, in a single operation.

2. A method as claimed in claim 1 wherein said segments are joined together by electron beam welding.

3. A method as claimed in claim 1 wherein said flat sheet material is in the form of an elongate strip, and the pressing operation is so performed that the circumferential direction of each segment lies initially across the width of said strip.

4. A method as claimed in claim 1 wherein each segment is semi-cylindrical, wherein the joints of adjacent bushes are aligned, and wherein the segments are joined by welding, the welding being interrupted at the end of each bush.

* * * * *